July 8, 1958 — C. M. GOLEMON — 2,841,880
LEVEL
Filed March 2, 1954
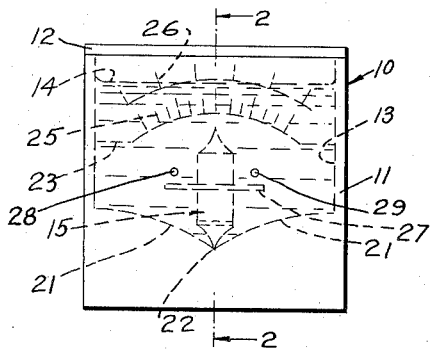
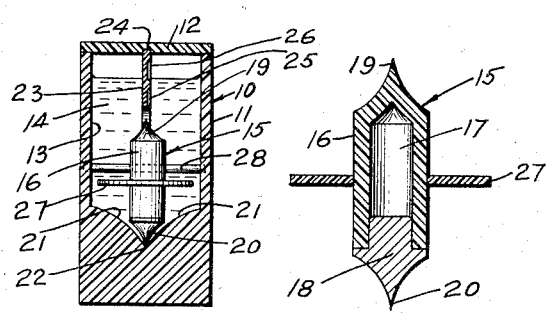
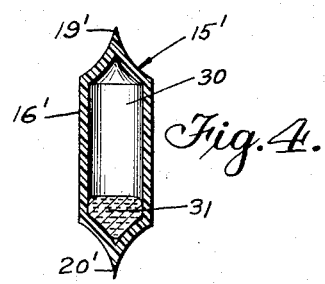
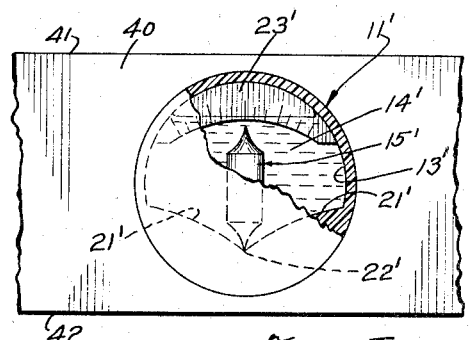
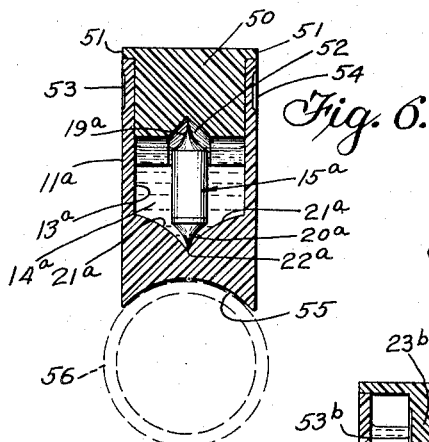
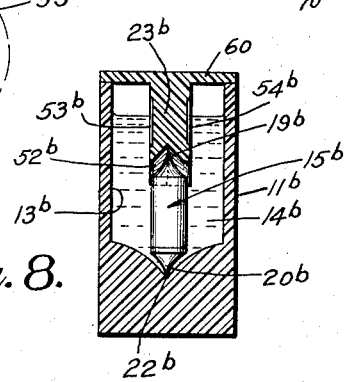
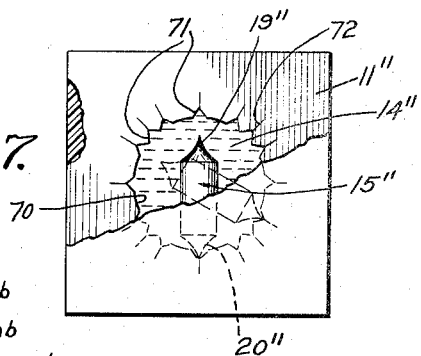
INVENTOR.
CHRISTOPHER M. GOLEMON.
BY
AGENT.

United States Patent Office 2,841,880
Patented July 8, 1958

2,841,880

LEVEL

Christopher M. Golemon, West Covina, Calif.

Application March 2, 1954, Serial No. 413,627

9 Claims. (Cl. 33—206)

The present invention relates generally to instruments for determining level conditions and relates more specifically to a new type of level instrument for use in building trades and the like.

Heretofore, devices for indicating level conditions have had several disadvantages that have been inherent in the common types of indicators utilized therewith. With levels employing a partially liquid filled, curved glass tube or plurality of such tubes in a support member, and utilizing an air space for determining level conditions, errors in the position assumed by the air space due to the surface tension on the interior of the glass tube, refraction errors in reading through the tube and compounded errors occasioned by reading in confined areas and through transparent covers, have rendered such levels ineffective and inaccurate for use in many instances where exact level conditions must be determined with a minimum amount of equipment. Additionally, prior devices of a like character have indicated level conditions only with little or no indication as to degree of displacement from such a level condition.

In many cases, in the building trades and the like, various elements are constructed in such a manner as to require disposition at an angle to a horizontal or vertical line. In these cases, contemporary level devices fail in providing a direct reading as to such angular relationships to the horizontal or vertical.

It is accordingly one object of the present invention to provide a novel instrument for determining and measuring various conditions relative to a level situation.

Another object of the present invention is to provide a level instrument having a novel construction and mode of operation.

A further object of the invention is to provide a level instrument that is economical in manufacture and sale, reliable and accurate in use and efficient in operation and reading characteristics.

A still further object of the present invention is to provide a level instrument having a freely floating indicating member with one or more bearing fulcrum points for the member.

It will be hereinafter seen that the present invention has other objects, advantages, and features, some of which, with the foregoing, to be set forth in the following description, in which certain embodiments of the invention have been selected for illustrative purposes only in the drawings accompanying and forming a part of the present specification, and wherein:

Fig. 1 is an elevational view showing one form of the level of the present invention;

Fig. 2 is a transverse sectional view taken substantially as indicated by line 2—2, Fig. 1;

Fig. 3 is an enlarged sectional view showing one form of the indicating member for use with the level of the present invention;

Fig. 4 is a view similar to Fig. 3 showing another form of indicating member;

Fig. 5 is an elevational view showing another form of the level of the present invention as in use with a support member;

Fig. 6 is a sectional view similar to Fig. 2 showing another form of the present invention;

Fig. 7 is an elevational view partially in section showing a further adaptation of the present level instrument; and Fig. 8 is a sectional view similar to Figs. 2 and 6 and showing a further modification of the present invention.

Referring to the drawing by reference characters wherein like characters indicate like parts, the level instrument of the present invention is shown in Figs. 1 and 2 as indicated generally at 10. As shown, the level 10 includes a body 11 that may be made from any suitable transparent material such as, for example, glass plastic or the like, there being a cover member 12 formed in connection with the body; however, it is to be understood that the cover 12 and the body 11 may be made integral and will define a chamber or cavity 13 therein. The body 11 is shown as being substantially square with the various sides being normal to adjacent sides, thus to provide a means for aligning the level instrument with a structure whose condition is to be determined.

As shown primarily in Figs. 1 and 2, the chamber 13 is adapted to contain a suitable liquid 14 that preferably partially fills the chamber 13. The liquid 14 may be of any suitable type or consistency depending upon the particular use to which the level instrument is to be placed; however, it has been found that a transparent high viscosity type of liquid such as, for example, glycerin, is adequate for use with the present invention.

An indicating member 15 is disposed within the chamber 13 and the liquid 14, this indicating member having an elongated body portion 16 that is made buoyant by means of a central bore 17. The lower end of the bore 17 is fitted with a suitable weight member 18 with the upper and lower ends of the indicating member 15 being provided with pointed portions 19 and 20.

A gradually tapered recess or bearing fulcrum is defined as by conically outwardly sloping walls 21 formed in the body 11 in the lower end of the chamber 13. An apex 22 formed at the lower end of the recess 21 provides a contact center point for the pointed end 20 of the indicating member 15, thereby permitting the indicating member to be freely floatable and movable within the liquid 14 in the chamber 13. The upper pointed end 19 of the indicator 15 is adapted to cooperate with a suitable scale member 23 that is secured to the body 11 as at 24. A plurality of scales indicated at 25 and 26 may be formed on the scale member 23 in order that the degree of variance from a level condition may be read by reference between the scales and the upper pointed end 19 of the indicating member 15. For example, the scale 25 may be adapted to read in degrees while the scale 26 may indicate pitch in order to increase the usefulness of the present level instrument.

In order that the indicating member 15 may be limited in its movement away from the recess defined by the walls 21, an annular flange 27 is formed on the outer surface of the indicating member approximately midway intermediate the ends 19 and 20. A pair of transverse pins 28 and 29 extend through the body of the instrument at points slightly above and spaced outwardly from the indicating member 15. The construction of the flange 27 and pins 28 and 29 is such as to limit both lateral and longitudinal movement of an indicating member 15 relative to the recessed defined by the walls 21.

It may thus be seen that the buoyant indicating member 15 will always seek its position in the apex 22 and will cooperate with the scales 25 and 26 formed on the scale member 23 to provide an accurate reading as to various level conditions or conditions relative to a horizontal or vertical plane.

In Fig. 4 a modified form of indicating member is shown wherein like parts are indicated by single prime reference characters. As shown, the indicating member 15' comprises an elongated portion 16' having a cavity 30 formed therein as by any suitable means. The indicating member 15' is provided with upper and lower pointed ends 19' and 20' with similar characteristics as those previously described and adapted for cooperation in a like manner with the other elements of the level instrument. A ball of mercury 31, or the like, may be disposed within the cavity 30 and will cooperate with either end of the indicating member 15' to provide a weight means for the member. It is to be understood of course that the recitation of mercury is merely by way of example and that other metals or materials that are heavier than the indicating member 15' will be equally suitable for the purpose herein intended.

In Fig. 5 another form of the invention is shown wherein like parts are indicated again by single primed reference numerals. As shown in this form of the invention, the body portion 11' is shown as being cylindrical and provided with walls 21' defining a recess which has an apex 22'. An indicating member 15' is adapted for association with the apex 22' and a scale member 23' is formed in the upper end of the instrument 11' and adapted for indicating various conditions relative to a level situation in cooperation with the upper end of the indicating member 15'. In this form of the invention, the level instrument 11' is adapted to be retained within a suitable support member 40 that is provided with suitable aligning surfaces 41 and 42. In this connection, it is to be understood that the support member may assume a configuration and have a variety of aligning surfaces depending upon the particular use to which the present level instrument is to be placed.

In Figs. 6 and 8, a further modification of the present level instrument is shown and various means have been also shown to limit movement of the indicating member relative to the various scales and position of the scales. In Fig. 6, the indicating member 15a is disposed in the chamber 13a, which is adapted to contain liquid 14a, the chamber 13a being formed within a suitable body 11a. The indicating member 13a is adapted for cooperation with an apex 22a of a suitable recess defined by the walls 21a. The upper end of the body member 11a is fitted with a combination cover and indicator restraining member 50 that has flanged portions 51 adapted for cooperation with the body portion 11a. The inner surface of the member 50 is provided with an arcuate V-shaped groove 52 in which the upper pointed end 19a of the indicating member 15a is adapted for disposition. It may thus be seen that the indicating member 15a is restrained in its movement relative to the apex 22a but is permitted rocking action thereon in order that various conditions relative to a level situation may be indicated and read on scales 53 and 54 that are formed, in this instance, on the outer surface of the body portion 11a. It may also be seen that the body 11a may be provided with an arcuate or semi-cylindrical lower surface 55 that is adapted for cooperation with a curved member whose level condition is to be measured as indicated at 56.

As previously indicated the modification of the present level instrument as indicated in Fig. 8 is similar to that of Fig. 6 and includes a body portion 11b having a chamber 13b formed therein and adapted to be partially filled with a liquid 14b. An indicating member 15b having upper and lower pointed ends 19b and 20b is disposed within the chamber 13b with the pointed end 20b being adapted for cooperation with an apex 22b of a recess defined by wall portions 21b. In this form of the invention, a cover member 60 is provided with an inwardly extending scale member 23b provided with an arcuate V-shaped groove 52b that is adapted for cooperation with the upper pointed end 19b of the indicating member 15b in a manner similar to that described in connection with the form of the invention shown in Fig. 6. The scale member 23b may also be provided with scales 53b and 54b on which the position of the indicating member 15b may be read.

The modification of the invention shown in Fig. 7 is intended for use in connection with such arrangements where it may be desirable to place the level instrument in various relationships to the structure to be measured as to its relationship to the horizontal or vertical. In this form of the invention, like parts will be indicated double primed reference numerals. As shown the modification of Fig. 7 includes a substantially rectangular body 11" in which a cylindrical chamber 70 is formed. The chamber 70 is adapted to contain a suitable liquid 14" there being an indicating member 15" disposed within the liquid 14" in the chamber 70. The indicating member 15" is of the type previously described in connection with the other forms of the invention and provided with an upper pointed end 19" and a lower weighted pointed end 20". The cylindrical wall of the chamber 70 is provided with a plurality of recesses 71 that are disposed at various positions along the wall of the chamber and adapted for operative cooperation with the pointed end 20" of the indicating member 15". It is to be noted that the recesses 71 are disposed at various angles to the outer aligning surfaces of the level instrument, these angles being by way of example disposed at 90 degrees, thirty degrees, 45 degrees and 60 degrees to the various aligning surfaces. Thus the modification of the level instrument of Fig. 7 is utilizable with any of the various aligning surfaces with the pointed end 19" of the indicator 15" cooperating with a scale 72 formed on the outer surface of the level instrument.

From the foregoing description, the uses, advantages, and operation of the present invention will be readily understood by those skilled in the art to which the invention appertains. While there have been shown and descirbed certain embodiments of the invention, it is desired to emphasize the fact that the invention may be applied to various types of level instruments, to have it understood that the examples given are merely illustrative, and that the invention is not to be limited to the details disclosed herein, but is to be accorded the full scope of the appended claims.

I claim:

1. A level comprising, in combination: a transparent body; aligning surfaces for said body; a chamber formed within said body; a liquid disposed in and partially filling said chamber; a pointed recess formed in one wall of said chamber; an elongated freely movable buoyant indicator disposed in said liquid in said chamber; a weight connected to one end of said indicator; pointed ends formed on said indicator, said one end being formed on said weight and adapted for seating in and cooperation with said pointed recess; a scale disposed in said chamber and adapted for cooperation with another of said pointed ends of said indicator; and means for limiting movement of said indicator relative to said pointed recess.

2. A level comprising, in combination: a transparent body; aligning surfaces on at least two sides of said body; a cylindrical chamber formed within said body; a liquid disposed in and partially filling said chamber; a pointed recess formed in one wall of said chamber; an elongated freely movable buoyant indicator disposed in said liquid in said chamber; a weight connected to one end of said indicator; pointed ends formed on said indicator, one of said ends being formed on said weight and adapted for seating in and cooperation with said pointed recess; a plurality of scales disposed in said chamber and adapted for cooperation with another of said pointed ends of said indicator; and means for limiting movement of said indicator in at least two directions relative to said pointed recess.

3. A level comprising, in combination: a transparent body; aligning surfaces for said body; a chamber formed within said body; a liquid disposed in and partially filling said chamber; a pointed recess formed in one wall of said chamber; an elongated freely movable indicator disposed in said liquid in said chamber; a weight arranged in one end of said indicator; pointed ends formed on said indicator, one of said ends being adapted for seating in and cooperation with said pointed recess; a scale disposed on the exterior of said body and adapted for readable cooperation with another of said pointed ends of said indicator; and means arranged in said body, aligned with said scale and closely confining said another of said pointed ends of said indicator for limiting movement of said indicator relative to said pointed recess.

4. A level comprising, in combination: a transparent body; aligning surfaces for said body; a chamber formed within said body; a liquid disposed in and partially filling said chamber; a pointed recess gradually tapered from at least three walls of and formed in one wall of said chamber; an elongated freely movable indicator disposed in said liquid in said chamber; a weight arranged in one end of said indicator; pointed ends formed on said indicator, one of said ends being adapted for seating in and cooperation with said pointed recess; a scale disposed on the exterior of said body and adapted for cooperation with another of said pointed ends of said indicator; and groove means arranged in said body aligned with said scale and closely confining said another of said pointed ends of said indicator for limiting movement of said indicator relative to said pointed recess, one of said aligning surfaces being semi-cylindrical for contact with a cylindrical object.

5. A level and carrier arrangement comprising, in combination: a level carrier; a cylindrical transparent body adapted for reception in said level carrier; aligning surfaces on said carrier; a chamber formed within said body; a liquid disposed in and partially filling said chamber; a pointed recess formed in one wall of said chamber; an elongated freely movable buoyant indicator disposed in said liquid in said chamber; a weight connected to one end of said indicator; pointed ends formed on said indicator, one of said ends being formed on said weight and adapted for seating in and cooperation with said pointed recess; means for limiting movement of said indicator in at least two directions; and a scale disposed in said chamber and adapted for cooperation with another of said pointed ends of said indicator.

6. A level comprising, in combination: a unitary transparent body; at least one aligning surface on said body; a chamber formed in said body and spaced from one end thereof; a pointed recess formed in a wall of said one end of said body, said recess having gradually tapered side portions extending outwardly from said recess to all walls of said chamber adjacent said recess; a hollow indicator member freely disposed in said chamber; a pointed weight secured in one end of said indicator; a liquid disposed in and at least partially filling said chamber to provide a buoyant medium for said indicator, said pointed weight carried by said indicator being adapted for engagement with said pointed recess, said side portions of said recess insuring positioning of said indicator to effect said engagement; a pair of transversely disposed pins in said body and extending through said liquid on each side of a normal vertical position of said indicator; a flange secured to a central area of said indicator, said flange being closely confined laterally between walls of said chamber, said pins, said walls and said flange cooperating to limit movement of said indicator in at least two directions; a point formed on another end of said indicator; a scale carrying member secured to and disposed inwardly from a wall of said chamber remote from said pointed recess, said scale carrying member being disposed in said liquid and spaced from other walls of said chamber; and a scale formed on said scale carrying member, said point on said indicator being adapted for readable cooperation with said scale.

7. A level comprising, in combination: a generally square unitary transparent body; a plurality of aligning surfaces on said body; a chamber formed in said body and spaced from one end thereof; a pointed recess formed in a wall of said one end of said body, said recess having gradually tapered and contoured side portions extending outwardly from said recess to all walls of said chamber adjacent said recess; a hollow elongated and cylindrical indicator member freely disposed in said chamber; a pointed weight secured in one end of said indicator; a liquid disposed in and at least partially filling said chamber to provide a buoyant medium for said indicator, said pointed weight carried by said indicator being adapted for engagement with said pointed recess, said side portions of said recess insuring positioning of said indicator to effect said engagement; a pair of transversely disposed pins in said body and extending through said liquid on each side of a normal vertical position of said indicator; an annular, outwardly extending flange secured to a central area of said indicator, said flange being closely confined laterally between walls of said chamber, said pins, said walls and said flange cooperating to limit movement of said indicator in at least two directions; a point formed on another end of said indicator; a relatively thin, transparent scale carrying member secured to and disposed inwardly from a wall of said chamber remote from said pointed recess, said scale carrying member being disposed in said liquid and spaced from other walls of said chamber; and a scale formed in said scale carrying member, said point on said indicator being adapted for readable cooperation with said scale.

8. A level comprising, in combination: a generally square unitary transparent body; a plurality of aligning surfaces on said body; a chamber formed in said body and spaced from one end thereof; a pointed recess formed in a wall of said one end of said body, said recess having gradually tapered and contoured side portions extending outwardly from said recess to all walls of said chamber adjacent said recess; a hollow elongated and cylindrical indicator member freely disposed in said chamber; a pointed weight secured in one end of said indicator; a liquid disposed in and at least partially filling said chamber to provide a buoyant medium for said indicator, said pointed weight carried by said indicator being adapted for engagement with said pointed recess, said side portions of said recess insuring positioning of said indicator to effect said engagement; a V-shaped, inwardly directed, semicircular groove formed in operative association with one wall of said chamber remote from said wall containing said pointed recess; a pointed end formed on said indicator member remote from said weight end thereof, said pointed end being adapted for spaced disposition in and confinement by said groove to limit lateral movement of said indicator member; and a scale formed on said body and disposed in readable alignment with said pointed end of said indicator member.

9. A level comprising, in combination: a generally square unitary transparent body; a plurality of aligning surfaces on said body; a chamber formed in said body and spaced from one end thereof; a pointed recess formed in a wall of said one end of said body, said recess having gradually tapered and contoured side portions extending outwardly from said recess to all walls of said chamber adjacent said recess; a hollow elongated and cylindrical indicator member freely disposed in said chamber; a pointed weight secured in one end of said indicator; a liquid disposed in and at least partially filling said chamber to provide a buoyant medium for said indicator, said pointed weight carried by said indicator being adapted for engagement with said pointed recess, said side portions of said recess insuring positioning of said indicator to effect said engagement; a V-shaped, inwardly directed, semicircular groove formed in operative association with one wall of said chamber remote from said wall containing said pointed recess, this said one wall having a portion thereof reduced in width and extending into said chamber; a pointed end formed on said indicator member remote from said weighted end thereof, said pointed end being adapted for spaced disposition in and confinement by said groove to limit lateral movement of said indicator member; and a scale formed on said reduced width wall portion of said body and disposed in readable alignment with said pointed end of said indicator member.

References Cited in the file of this patent

UNITED STATES PATENTS

| | | |
|---|---|---|
| 807,992 | Barclay | Dec. 19, 1905 |
| 898,349 | Fielding | Sept. 8, 1908 |
| 1,116,452 | Lorraine | Nov. 10, 1914 |
| 1,399,090 | Spencer | Dec. 6, 1921 |
| 1,541,455 | White | June 9, 1925 |
| 1,855,664 | Budge | Apr. 26, 1932 |
| 2,092,179 | Nosal | Sept. 7, 1937 |
| 2,249,728 | Cross | July 22, 1941 |
| 2,438,229 | Price | Mar. 23, 1948 |
| 2,653,389 | Butterworth et al. | Sept. 29, 1953 |

FOREIGN PATENTS

| | | |
|---|---|---|
| 117,161 | Great Britain | July 11, 1918 |
| 182,540 | Great Britain | June 30, 1922 |